(12) United States Patent
Kawazoe et al.

(10) Patent No.: US 6,189,950 B1
(45) Date of Patent: Feb. 20, 2001

(54) SEALING STRUCTURE FOR A CONVERTIBLE

(75) Inventors: Takeo Kawazoe, Hiroshima; Hideki Yoshioka, Tokyo; Katsuhisa Ishihara, Tokyo; Yoshihiro Aoi, Tokyo, all of (JP)

(73) Assignee: Nishikawa Rubber Co., Ltd., Hiroshima (JP)

( * ) Notice: Under 35 U.S.C. 154(b), the term of this patent shall be extended for 0 days.

(21) Appl. No.: 09/178,241

(22) Filed: Oct. 23, 1998

(30) Foreign Application Priority Data

Oct. 29, 1997 (JP) .................................................. 9-314375
Oct. 29, 1997 (JP) .................................................. 9-314376

(51) Int. Cl.[7] ............................... B60J 10/02; B60J 10/08
(52) U.S. Cl. .................................. 296/107.04; 296/146.9
(58) Field of Search ..................... 296/107.04, 146.14, 296/222, 135, 93, 146.9

(56) References Cited

U.S. PATENT DOCUMENTS

| 4,729,593 | * | 3/1988 | Nisiguchi et al. | 296/107.04 |
| 5,601,329 | * | 2/1997 | Glagow et al. | 296/146.14 |
| 5,950,366 | * | 9/1999 | Uhlmeyer | 296/93 |

FOREIGN PATENT DOCUMENTS

| 2-7060 | 2/1990 | (JP) . |
| 2-7061 | 2/1990 | (JP) . |
| 2-34979 | 9/1990 | (JP) . |
| 2-38017 | 8/1991 | (JP) . |
| 5-77645 | 3/1993 | (JP) . |

\* cited by examiner

Primary Examiner—D. Glenn Dayoan
Assistant Examiner—Greg Blankenship
(74) Attorney, Agent, or Firm—Frishauf, Holtz, Goodman, Langer & Chick, P.C.

(57) ABSTRACT

The present invention relates to a sealing structure for a convertible, by which water used for washing, etc. is prevented from invading inside the compartment. In a sealing structure for a convertible, the roof of which is openable at a foldable hood portion 1, the attaching base 5a of weather strip 5 is fitted to a retainer 7 fixed at a link 6, the end portions 8a of elevating and lowering side glass 8 are resiliently engaged in the hollow sealing portion 5b of the weather strip 5 when the hood portion 1 is closed, and the hood sealing portion 10 is resiliently engaged in the hood portion 1 from inside the compartment; another hood sealing portion 15 corresponding to the folding portions X, Y and Z of the hood portion 1 is die-molded at the end portion of the hood sealing portion 10.

6 Claims, 6 Drawing Sheets

SEALING STRUCTURE FOR A CONVERTIBLE

FIELD OF THE INVENTION

The present invention relates to a sealing structure for a convertible having an openable top, the roof of which is a foldable hood.

BACKGROUND OF THE INVENTION

FIG. 7 is a view showing the appearance of a convertible to which hood portion 1 being a non-fixed roof is attached. The hood portion 1 is an openable roof which is foldable centering around the connecting lines X—X, Y—Y and Z—Z. The hood portion 1 folded when the roof is opened is accommodated in the rear lower section (not illustrated) of a vehicle, and when the roof is closed, the front edge of the hood portion 1 is engaged with the header 3, which fixes the upper end of the front glass 2, and the upper end of the hood portion of the front pillar 4 as shown in FIG. 7.

As shown in FIG. 8 and FIG. 9, a weather strip 5 is attached to both side ends of the hood portion 1 via a retainer 7 directly fixed at a link 6 which becomes a hood rib. The weather strip 5 consists of an attaching base 5a fitted into the retainer 7; a hollow sealing portion 5b with which the terminal ends 8a of the front glass 8, being an elevating side window glass, and 9a of the quarter glass 9 are resiliently engaged when being elevated; a seal lip portion 5c resiliently engaged with the link 6; and a seal lip portion 5d resiliently engaged with the hood sealing portion 10 which is provided between the link 6 and hood portion 1 and is resiliently engaged with the hood portion 1 from inside of the compartment when being closed; which are formed integral with each other. Herein, FIG. 8 is a side view showing the positional relationship between the weather strip 5 and the hood sealing portion 10, and FIG. 9 is a cross-sectional view taken along the line A—A, in FIG. 7, which corresponds to the cross-sectional view taken along the line A—A in FIG. 8.

Although the hood sealing portion 10 shown in FIG. 9 is hollow, there may be available a hood sealing portion 11 having a lip 11a formed as shown in FIG. 10. The fixing direction of the hood sealing portion 10 is different from that of the hood sealing portion 11. However, they are directly fixed at the link 6.

However, in a convertible having a foldable hood portion 1, since there is no retainer 7 at the folding portions X, Y and Z, that is, nothing to support the weather strip 5, it is very difficult to seal the folding portions. Moreover, there are some types of convertibles in which the link 6 is not continuous. In such cases, the sealing is made further difficult.

Therefore, usually, as shown in FIG. 8, the ends of adjacent weather strips 5 are caused to overlap several :millimeters (overlapping portion L) when the hood portion 1 is closed, wherein the sealing is secured between the weather strips 5. The ends of the weather strips 5 are die-molded to ensure that the overlapping is secured with reliability.

Furthermore, usually, as shown in FIG. 8, although, when the hood portion 1 is closed, the sealing between the hood sealing portions 10 or between the hood sealing portions 11 is secured by causing the ends of the adjacent hood sealing portions 10 or adjacent hood sealing portions 11 to butt into each other (clearance-free contact), the ends of the hood sealing portions 10 or hood sealing portions 11 are not die-molded.

Furthermore, the hood sealing portion 10 or sealing portion 11 is attached to the link 6 and the weather strip 5 is assembled to the retainer 7 separately from each other, a gap is likely to occur between the hood sealing portions and the weather strip due to unevenness or imbalance in the assembling, wherein the sealing between the link 6 and hook 1 is made insufficient.

Therefore, in the cross-sectional portion taken along the line B—B in FIG. 8, it is made somewhat difficult that the weather strip 5, hood sealing portions 10 and 11 are located at their appointed positions in a stable condition. That is, it is difficult to secure the sealing effect as intended. For example, if water used for washing is splashed onto the folding portions X, Y, Z, such a problem arises, where the water W invades the automobile compartment.

Furthermore, in the sealing structure shown in FIG. 9 and FIG. 10, (1) The link 6 and retainer 7 are iron-based metal and iron or iron-based metal and stainless steel, etc., and they are fixed by studs or screws at several points. Therefore, the sealing between the link 6 and retainer 7 is insufficient.

(2) Since the hood sealing portion 10 or hood sealing portion 11 is attached to the link 6 and weather strip 5 is attached to the retainer 7 separately from each other, a gap is likely to occur between the hood sealing portions and the weather strip due to unevenness or imbalance in the assembling, wherein the sealing between the link 6 and hood 1 is made insufficient.

(3) With respect to a method for attaching the hood sealing portion 10 or hood sealing portion 11 to the link 6, the fixing method is difficult, and there are thus some limitations in shape where it is difficult to secure a sufficient sealing performance.

(4) It is difficult to achieve a secure sealing between the hood 1 and the hood sealing portion 10 or hood sealing portion 11 because the hood is made of cloth.

In particular, it is very difficult to secure a sufficient sealing performance at the folding portions of the hood 1. Although there have been attempts to improve the sealing performance by devising the shape of the weather strip 5 and the hood sealing portions 10 or 11, it is difficult to prevent water from leaking in the automobile compartment with any sufficient sealing performance secured.

SUMMARY OF THE INVENTION

It is, therefore, an object of the invention to provide a sealing structure for a convertible, by which water used for washing, etc., can be prevented from invading the automobile compartment.

In order to achieve the above-mentioned object, the invention described in claim 1 is a sealing structure for a convertible having an openable top, the roof of which is a foldable hood portion (1), a weather strip (5) in which at least a sealing portion (5b) and an attaching base (5a) are formed integral with each other is fitted into a retainer (7) fixed at a hood rib (6), the end portions (8a, 9a) of elevating side glass (8,9) are resiliently engaged in the sealing portion (5b) of the weather strip (5) when said hood portion (1) is closed, and a hood sealing portion (10) is resiliently engaged in the hood portion (1) from inside of the compartment, wherein another hood sealing portion (15) corresponding to the folding portions (X, Y, Z) of said hood portion (1) is die-molded at the end portion of said hood sealing portion (10).

The invention described in claim 2 (and claim 6) is a sealing structure for a convertible as set forth in claim 1, wherein the die-molded hood sealing portion (15) is further die-molded integral with the end portion of the sealing portion (5b) of the weather strip (5), which corresponds to the folding portions (X, Y, Z) of the hood (1).

The invention described in claim 3 is a sealing structure for a convertible as set forth in claim 1 or 2, wherein engaging portions (37b, 37c) are formed at the retainer (37) in addition to a fitting portion (37a) of the attaching base (35a) and the hood sealing portion (40) is built in the engaging portions (37b, 37c).

The invention described in claim 4 is a sealing structure for a convertible, having an openable top, the roof of which is a hood portion (1), a weather strip (25) in which at least a hollow sealing portion (25b) and an attaching base (25a) are formed integral with each other is fitted into a retainer (27) fixed at a hood rib (26), the end portions (8a, 9a) of elevating side door glasses (8, 9) are resiliently engaged in the hollow sealing portion (25b) of the weather strip (25) when said hood portion (1) is closed, and a hood sealing portion (30) is resiliently engaged in the hood portion (1) from inside of the compartment, wherein engaging portions (27b, 27c) for the hood sealing portion (30) are formed at said retainer (27) in addition to a fitting portion (27a) for said attaching base (25a), and said hood sealing portion (30) is a member integral with the weather strip (25), and wherein said hood sealing portion (30) is assembled to the engaging portions (27b, 27c) in such a state where they are connected to the hollow sealing portion (25b) so that a part of the hood sealing portion (30) shields between the hood portion (1) and engaging portions (27b, 27c).

The invention described in claim 5 is a sealing structure for a convertible, having an openable top, the roof of which is a hood portion (1), a weather strip (35) in which at least a hollow sealing portion (35b) and an attaching base (35a) are formed integral with each other is fitted into a retainer (37) fixed at a hood rib (26), the end portions (8a, 9a) of elevating side door glasses (8, 9) are resiliently engaged in the hollow sealing portion (35b) of the weather strip (35) when said hood portion (1) is closed, and a hood sealing portion (40) is resiliently engaged in the hood portion (1) from inside of the compartment, wherein engaging portions (37b, 37c) for the hood sealing portion (40) are formed at said retainer (37) in addition to a fitting portion (37a) for said attaching base (35a), and said hood sealing portion (40) is a member separate from the weather strip (35) and assembled to the engaging portions (37b, 37c) between the engaging portions (37b, 37c) and the hood portions (1), wherein said hood sealing portion (40) is resiliently engaged in the hollow sealing portion (35b) so that a seal lip portion (40c) secured at the hood sealing portion (40) shields between the hood portion (1) and engaging portions (37b, 37c).

The numerals in the brackets are shown in the drawings and show the corresponding elements and parts in the preferred embodiment of the invention described herein below.

Since a sealing structure for a convertible described in claim 1 is such that another hood sealing portion opposite to the folding portions of the hood portion is die-molded at the end portions of the hood sealing portion resiliently engaged in the hood portion from the inside of a compartment, the gap between the folding portions of the hood portion and an overlapped weather strip is plugged up when the hood portion is closed. Therefore, even though water used for washing is splashed between the hood portion and the weather strip, water can be prevented from entering the compartment of an automobile by a die-molded hood sealing portion.

Furthermore, according to the invention described in claim 2(and claim 6), in addition to the actions and effects of the invention described in claim 1, the die-molded hood sealing portion is formed integral with the weather strip at the folding portions of the hood portion. Therefore, there is no situation where water invades inside an automobile between the die-molded hood sealing portion and the weather strip.

Furthermore, according to the invention described in claim 3, in addition to the actions and effects of the invention described in claim 1 or 2, since the engaging portion of the hood sealing portion is specially formed at the retainer differing from a case where the hood sealing portion is fixed at a hood rib, the fixing force in assembling with respect to the engaging portions is increased to cause the hood sealing portion to be fixed in a stable condition. Therefore, the hood sealing portion die-molded at the end portions of the stabilized hood sealing portions is stabilized even though it is not supported at the folding portions of the hood portion at all, and it is securely caused to overlap when the hood portion is closed.

Furthermore, according to the invention described in claim 4, the hood sealing portion and weather strip are formed to be integral with each other and is assembled at the retainer, and furthermore, the space between the hood portion and the engaging portions can be shielded by connection of the hood sealing portion and weather strip. Therefore, for example, even though high pressure water used for washing is splashed between the hood portion and weather strip, no high pressure water invades the retainer side. Although water is intended to invade between the hood portion and the hood sealing portion, since the hood sealing portion is formed integral with the weather strip and is further engaged in the retainer, and therefore the entire hood sealing portion is firmly attached and is fixed with a little unevenness in the attaching positions, which brings that the sealing effect is excellent, it is possible for water to be securely prevented from invading the compartment. Furthermore, the sealing effect can be improved by increasing the thickness of the sealing portion of the hood sealing portion.

According to the invention described in claim 5, as in the case, described in the invention of claim 4, where a hood sealing portion and a weather strip are formed integral with each other, such an excellent sealing effect can be obtained with respect to water which is intended to invade between the hood portion and hood sealing portion since the hood sealing portion is stabilized. The hood sealing portion is made separate from the weather strip, wherein the seal lip portion of the hood sealing portion and hollow sealing portion are resiliently engaged in each other, and therefore, the sealing performance is slightly less than the integral structure, they are simpler and more advantageous than the integral structure in view of production by extrusion molding and/or die molding.

As described above, according to the invention described in claim 1, since another hood sealing portions corresponding to the folding portions of the hood portion are die-molded at the end portions of the hood sealing portions which are resiliently engaged in the hood portion of a convertible from inside the compartment in order to cause the clearance of the folding portions of the hood portion to be plugged in, water can be prevented from invading inside the compartment by the die-molded hood sealing portions even though water used in, for example, washing, is splashed between the hood portion and weather strip portion.

According to the invention described in claim 2(and claim 6), in addition to the actions and effects of the invention described in claim 1, since the die-molded hood sealing portions are also formed to be integral with the weather strip at the folding portions of the hood, water does not invade inside the compartment between the die-molded hood sealing portions and weather strip.

According to the invention described in claim 3, in addition to the actions and effects of the invention described in claim 1 or 2, the fixing force with respect to the engaging portions when being assembled is increased and the hood sealing portions are fixed in a stabilized state since the engaging portions of the hood sealing portions are specially formed at the retainers. Therefore, the hood sealing portions die-molded at the end portions of the stabilized hood sealing portions are well stabilized even though no support is provided at the folding portions of the hood portion and they securely overlap each other when the hood portion is closed. Accordingly, the sealing performance is further improved.

According to the invention described in claim 4, since the hood sealing portions and weather strip are molded integral with each other and are attached to the retainer so that they shield between the hood portion and the engaging portions, high pressure water is not permitted to invade the retainer side even though high pressure water used in, for example, washing is splashed between the hood portion and weather strip. In addition, even though water is intended to invade between the hood portion and hood sealing portions, since the entire hood sealing portion is firmly fixed so as to permit only a small unevenness at its attaching position, which brings that the sealing effect is excellent, water can be prevented from invading inside the compartment without fail. This effect can be fully displayed at the folding portions of the hood portion.

According to the invention described in claim 5, the hood sealing portion is stabilized as in the integral structure described in claim 4, with respect to water which is intended to go in between the hood portion and hood sealing portions. Therefore, an excellent sealing effect can be obtained. Since the seal lip portion is resiliently engaged in the hollow sealing portion as the hood sealing portion is made separate from the weather strip, the sealing performance is slightly lowered in comparison with a connection by an integrally molded structure. However, the invention is simpler and more advantageous than the integrally molded structure, in view of production by extrusion molding and/or die molding.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Figure 1:
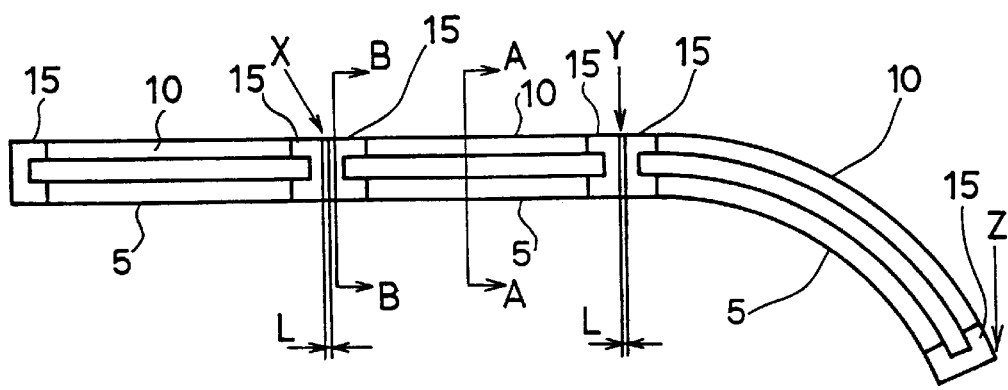
FIG. 1 is a side view showing the positional relationship between the weather strip and hood sealing portions according to a preferred embodiment of the invention.
Figure 2:
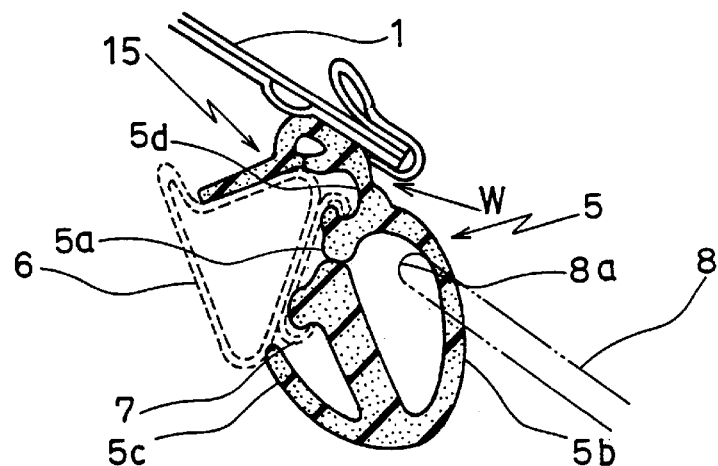
FIG. 2 is a cross-sectional view taken along the line B—B in FIG. 7 according to the preferred embodiment of the invention.
Figure 9:
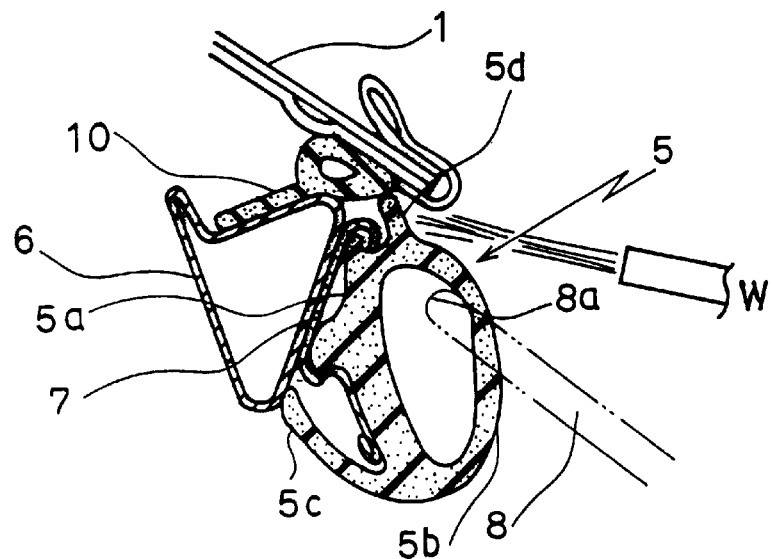
FIG. 9 is a cross-sectional view taken along the line A—A in FIG. 7 according to the conventional example.

A description is given of embodiments of the invention with reference to the accompanying drawings, wherein the parts which are identical to those in a conventional example are given the same reference numerals, and the description thereof is omitted. FIG. 1 is a side view showing the positional relationship between the weather strip and hood sealing portion of a sealing structure for a convertible according to the embodiment of the invention. FIG. 2 is a cross-sectional view taken along the line B—B in FIG. 7 according to the embodiment of the invention, and corresponds to a cross-sectional view taken along the line B—B in FIG. 1. The cross-sectional view taken along the line A—A in FIG. 7 according to the embodiment of the invention is similar to the conventional example and is as shown in FIG. 9.

As in the conventional example, a sealing structure for a convertible according to an embodiment of the invention is such that, in a convertible in which the roof of the vehicle is a foldable type hood portion 1 and openable, a weather strip 5 in which a hollow sealing portion 5b and attaching base 5a are formed to be integral with each other is fitted to a retainer 7 fixed at a link 6 which becomes a hood rib, end portions 8a of elevating and lowering side glass 8 are resiliently engaged in the hollow sealing portion 5b of the weather strip 5 (this is the same with respect to quarter glass 9) when the hood portion 1 is closed, and the hood sealing portion 10 is resiliently engaged in the hood portion 1 from inside the compartment. Seal lip portions 5c and 5d are formed to be integral with the weather strip 5 as in the conventional example.

In particular, as shown in FIG. 1 and FIG. 2, another hood sealing portion 15 which is different from the above-mentioned hood sealing portion 10 is provided at the positions corresponding to the folding portions X, Y, Z of the hood portion 1. That is, another hood sealing portion 15 is die-molded and provided at the end portion of the extrusion-molded hood sealing portion 10.

In addition, another die-molded hood sealing portion 15 is die-molded integral with the end portion, corresponding to the folding portions X, Y and Z of the hood portion 1, of the hollow sealing portion 5b of the weather strip 5. It is die-molded via the portion which was the seal lip portion 5d in this embodiment.

Accordingly, as shown in FIG. 1, when the hood portion 1 is closed, the end portions of weather strip 5 on which another hood sealing portion 15 is die-molded are caused to overlap (lapping portion L) each other several millimeters along with the hood sealing portion 15, whereby the sealing performance between the weather strips 5 can be secured.

Thus, the gap between the hood portion 1 of the folding portions X, Y and Z of the hood portion 1 and the overlapped weather strip 5 is plugged in by newly die-molding the hood sealing portion 15. Therefore, even though water W used in, for example, washing is splashed on between the hood portion 1 and the weather strip 5, the water W can be prevented from invading the compartment of the automobile by the hood sealing portion 15.

In addition thereto, since the hood sealing portion 15 is molded to be integral with the weather strip 5, the water W does not invade the compartment between the hood sealing portion 15 and weather strip 5.

Figure 3:
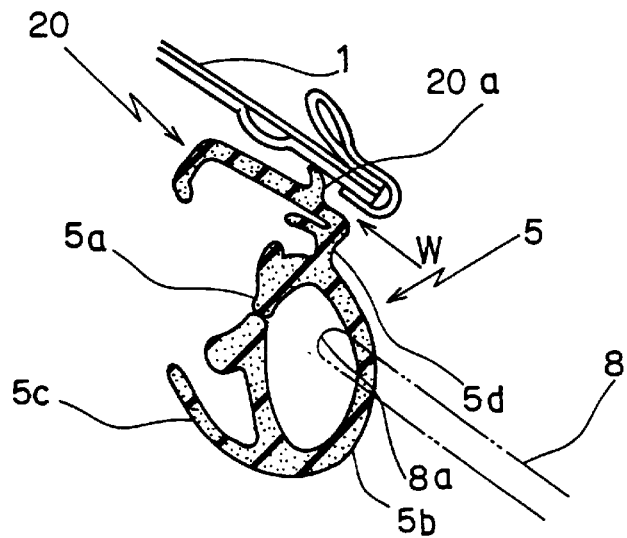
FIG. 3 is a cross-sectional view taken along the line B—B in FIG. 7 according to another embodiment of the invention.
Figure 7:
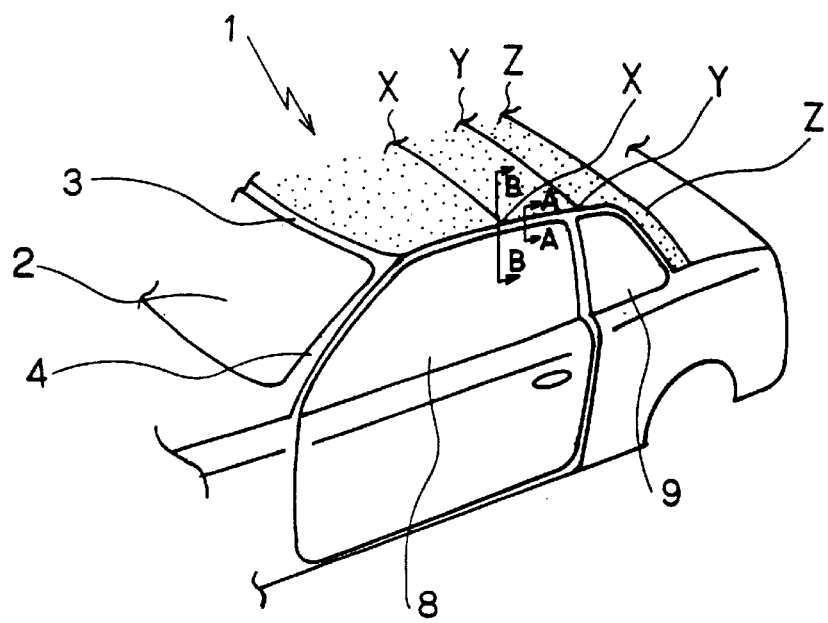
FIG. 7 is an appearance view of a convertible.
Figure 8:
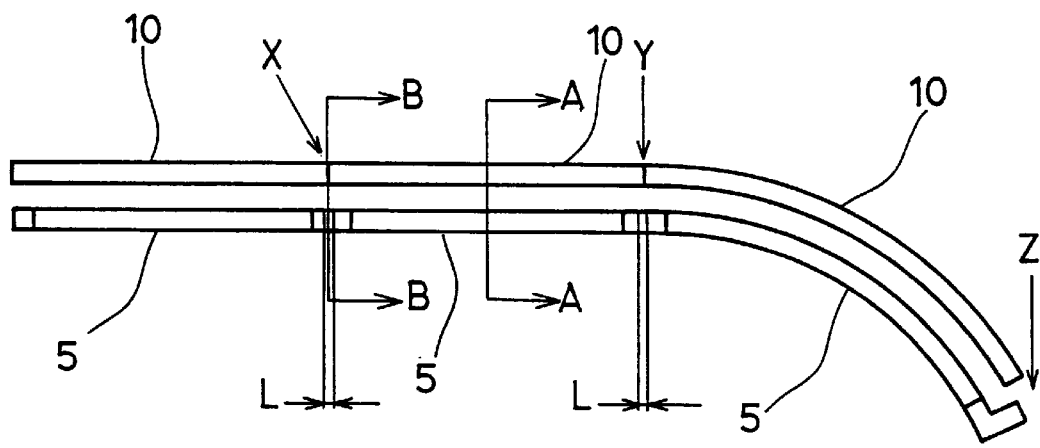
FIG. 8 is a side view showing the positional relationship between the weather strip and hood sealing portions according to a conventional example.
Figure 10:
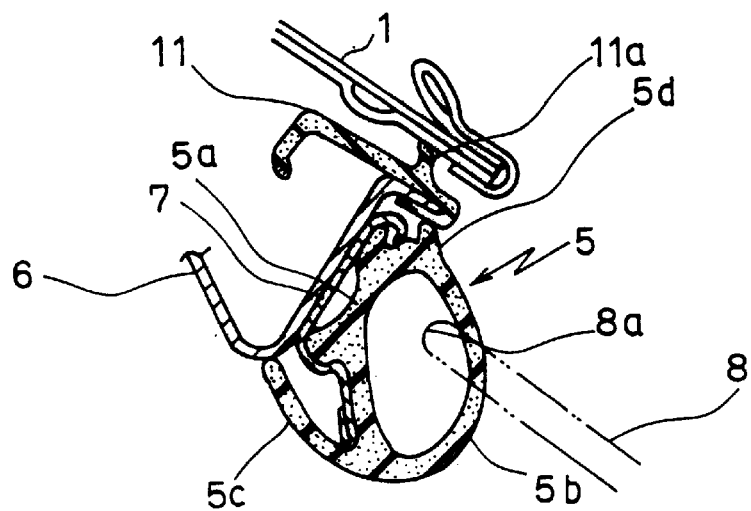
FIG. 10 is a cross-sectional view taken along the line A—A in FIG. 7 according to another conventional example.
Figure 11:
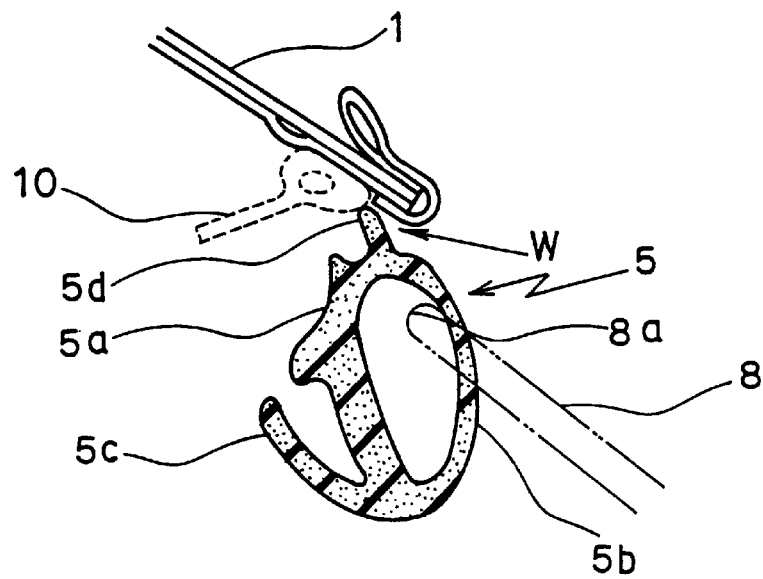
FIG. 11 is a cross-sectional view taken along the line B—B in FIG. 7 according to the conventional example.
Figure 12:
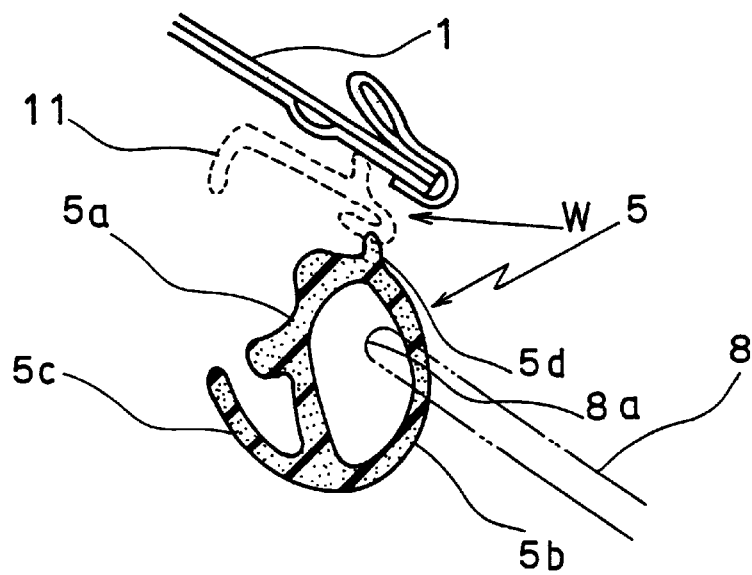
FIG. 12 is a cross-sectional view taken along the line B—B in FIG. 7 according to another conventional example.

FIG. 3 is a cross-sectional view taken along the line B—B in FIG. 7 according to another preferred embodiment of the invention and corresponds to the cross-sectional view taken along the line B—B in FIG. 1. This is such that a hood sealing portion 20 is die-molded at the end portion of a hood sealing portion 11 (FIG. 10), on which a lip portion 11a illustrated in the conventional example is formed, and is also formed integral with the weather strip 5, whereby water W is prevented from invading the compartment through the folding portions X, Y and Z of the hood portion 1 as in the sealing structure illustrated in FIG. 2. The cross-sectional view taken along the line A—A in FIG. 7 according to another embodiment of the invention is similar to that of the conventional example and is constructed as shown in FIG. 10.

Figure 4:
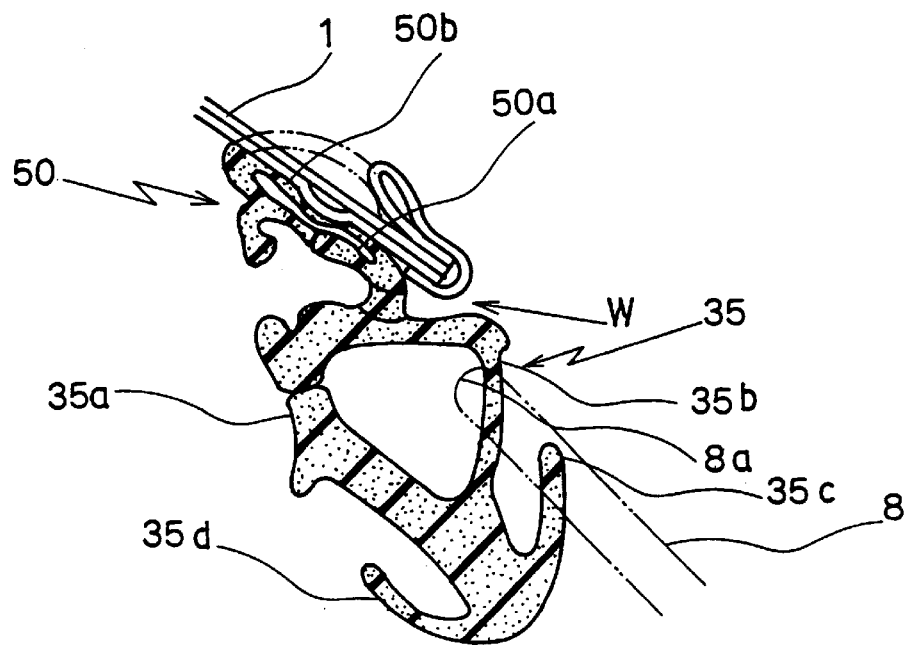
FIG. 4 is a cross-sectional view taken along the line B—B in FIG. 7 according to the embodiment of the invention.
Figure 5:
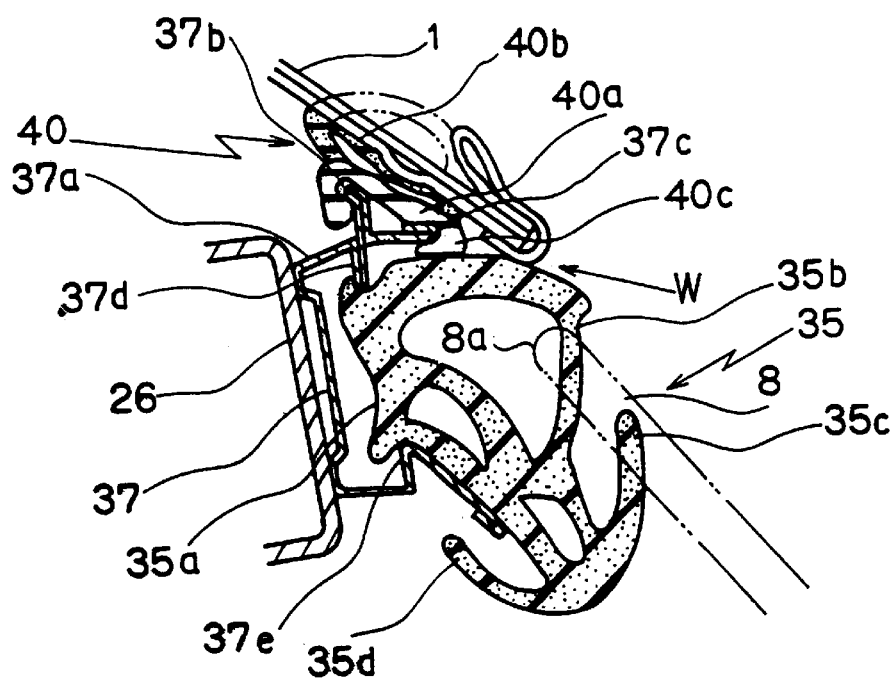
FIG. 5 is a cross-sectional view taken along the line A—A in FIG. 7 according to the embodiment of the invention.

Furthermore, the cross-sectional view taken along the line B—B in FIG. 1 may be constructed as shown in FIG. 4, and the cross-sectional view taken along the line A—A in FIG. 1 may be constructed as shown in FIG. 5.

That is, engaging portions 37b and 37c are formed at a retainer 37 (although the retainer 37 is directly fixed at the link 26, it may be indirectly fixed via, for example, a spacer) fixed at a link 26 in addition to the fitting portions 37a for an attaching base 35a of the weather strip 35. The base portion 40a of a hood sealing portion 40 on which the base portion 40a thereof is formed to be integral with a hollow sealing portion 40b is assembled at the engaging portions 37b and 37c between the engaging portions 37b, 37c and the hood portion 1. The fitting portion 37a of the retainer 37 is folded so as to have a C-shaped cross section having claws 37d, 37e at its upper and lower parts, and further the retainer 37 is folded downward to form the engaging portion 37b from an upward perpendicular extension of the retainer 37 after forming the upper claw portion 37d and is roughly horizontally folded outside the compartment to form the engaging portion 37c at the tip end of the retainer 37.

Thus, since the engaging portions 37b and 37c exclusive for the hood sealing portion 40 are formed at the retainer 37, differing from a case (FIG. 9, FIG. 10) where the hood sealing portion 40 is formed at the link 6, the fixing force for assembling engaging portions 37b and 37c is increased to the hood sealing portion 40 to be stabilized. Therefore, a hood sealing portion 50 die-molded at the end portion of the stabilized hood sealing portion 40 is stabilized even though it is not supported at the folding portions X, Y and Z of the hood portion 1, and overlaps without fail when the hood portion 1 is closed.

Furthermore, the seal lip portion 40c secured at the hood sealing portion 40 is resiliently connected to the hollow sealing portion 35b of the weather strip 35 so that the space between the hood portion 1 and engaging portions 37b and 37c are shielded, wherein the sealing performance between the hood portion 1 and weather strip 35 is achieved at parts other than the folding portions X, Y and Z of the hood portion 1. Therefore, with respect to water W which is likely to invade between the hood portion 1 and hood sealing portion 40, the hood sealing portion 40 is stabilized, and an excellent sealing effect can be secured.

As shown in FIG. 4, at the folding portions X, Y and Z of the hood portion 1, another hood sealing portion 50 is die-molded at the end portion of the hood sealing portion 40 extrusion-molded as shown in FIG. 2 and FIG. 3, and is provided integral with the end portion.

The seal lip portion 35c and sub lip portion 35d which are resiliently engaged with elevating and lowering front door glass 8 are molded to be integral with the weather strip 35.

Figure 6:
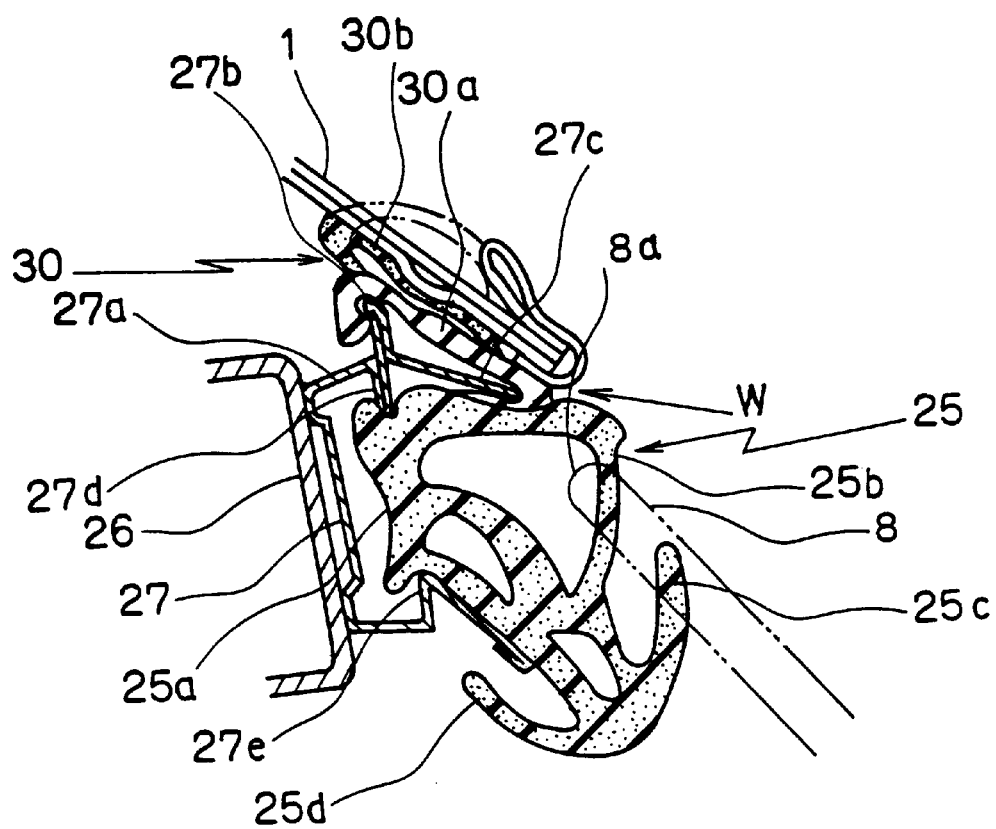
FIG. 6 is a cross-sectional view taken along the line A—A in FIG. 7 according to still another embodiment of the invention.

Furthermore, the cross-sectional view taken along the line A—A in FIG. 1 may be constructed as shown in FIG. 6.

The attaching base 25a of the weather strip 25 is fitted to a retainer 27 (although the retainer 27 is directly fixed at a link 26, it may be indirectly fixed at the link 26 via, for example, a spacer) fixed at the link 26 which will become a hood rib of the hood portion 1, and when the hood portion 1 is closed, the end portion 8a of the elevating and lowering front door glass 8 is resiliently engaged in a hollow sealing portion 25b formed integral with the attaching base 25a of the weather strip 25, wherein a hood sealing portion 30 is resiliently engaged in the hood portion 1 from inside the compartment.

In particular, at the retainer 27 are formed engaging portions 27b and 27c for a hood sealing portion 30 in addition to a fitting portion 27a for the attaching base 25a of the weather strip 25. That is, the fitting portion 27a is folded so as to have a C-shaped cross section having claws 27d and 27e at its upper and lower parts, and further the retainer 27 is folded downward to form the engaging portion 27b from an upward perpendicular extension of the retainer 27 after forming the upper claw portion 27d and is roughly horizontally folded to form the engaging portion 27c at the tip end of the retainer 27.

The hood portion 30 is formed integral with the weather strip 25 and is extrusion-molded in such a state that the lower part of the base portion 30a being a part of the hood sealing portion 30 is connected to the hollow sealing portion 25b of the weather strip 25 (Furthermore, it may be die-molded).

The hood sealing portion 30 is disposed between the engaging portions 27b and 27c and the hood portion 1, and the upper and lower sides of the base portion 30a of the hood sealing portion 30 are assembled to the engaging portions 27b and 27c so that the space between the hood portion 1 and the engaging portions 27b and 27c is shielded.

Although not particularly limited, if the base portion 30a is made of solid rubber, the fixing force with respect to the engaging portions 27b and 27c can be increased in assembling, and therefore, the hood sealing portion 30 is further stabilized.

The hollow sealing portion 30b is formed integral with the base portion 30a of the hood sealing portion 30 and the hollow sealing portion 30b is resiliently engaged with the hood portion 1 from inside the compartment. Furthermore, the seal lip portion 25c and sub lip portion 25d which are resiliently engaged in the elevating and lowering front door glass 8 are formed integral with the weather strip 25.

According to such a sealing structure, even though high pressure water W used in, for example, washing is splashed between the hood portion 1 and the weather strip 25, high pressure water W does not invade the retainer 27 side since the hood sealing portion 30 and weather strip 25 are made integral with each other and the hood sealing portion 30 is assembled so as to shield between the hood portion 1 and the engaging portions 27b and 27c. Although water W is likely to invade between the hood portion 1 and hood sealing portion 30, since the hood sealing portion 30 is such that the lower side of its base portion 30a is formed integral with the weather strip 25 and the upper side of the base portion 30a is sufficiently engaged in the retainer 27, the entire hood sealing portion 30 is firmly fixed and the attaching position is almost free from any unevenness, so that the sealing effect is improved. The thickness of the hollow sealing portion 30b is further increased, thereby securely preventing water W from invading the automobile compartment.

Although the retainer 37 shown in FIG. 5 is similar to the retainer 27 shown in FIG. 6, the position of the engaging portion 37c at the retainer 37 side is made slightly higher than the engaging portion 27c at the retainer 27 side, so that the seal lip portion 40c is resiliently engaged in the hollow sealing portion 35.

The sealing performance is slightly lower in the case where a seal lip portion 40c separate from the hollow sealing portion is resiliently engaged in the hollow sealing portion 35b shown in FIG. 5 than in a case where both of them are made integral with each other as shown in FIG. 6. However, the former is simpler and more advantageous than the latter integral structure in view of production by extrusion molding or die molding.

What is claimed is:

1. A sealing structure for a convertible having an openable and closable top made up of a foldable hood portion, said sealing structure comprising:

a weather strip in which at least a sealing portion and an attaching base are formed integral with each other, wherein said weather strip is fitted into a retainer fixed at a hood rib, wherein end portions of an elevating side door glass of the convertible are resiliently engaged in the sealing portion of the weather strip when said hood portion of the convertible is closed, and a first hood sealing portion is resiliently engaged in the hood portion from inside a compartment of the convertible, and wherein a second hood sealing portion corresponding to folding portions of said hood portion is die-molded at an end portion of said first hood sealing portion.

2. A sealing structure for a convertible as set forth in claim 1, wherein said second hood sealing portion is also die-molded integral with an end portion of the sealing portion of said weather strip corresponding to the folding portion of said hood.

3. A sealing structure for a convertible as set forth in claim 1, wherein engaging portions are formed at said retainer in addition to a fitting portion of said attaching base, and said first hood sealing portion is formed in said engaging portions.

4. A sealing structure for a convertible as set forth in claim 2, wherein engaging portions are formed at said retainer in addition to a fitting portion of said attaching base, and said first hood sealing portion is formed in said engaging portions.

5. A sealing structure for a convertible having an openable and closeable top made up of a hood portion, said sealing structure comprising:

a weather strip in which at least a hollow sealing portion and an attaching base are formed integral with each other, wherein said weather strip is fitted into a retainer fixed at a hood rib, wherein end portions of an elevating side door glass are resiliently engaged in the hollow sealing portion of the weather strip when said hood portion of the convertible is closed, and a hood sealing portion is resiliently engaged in the hood portion from inside a compartment of the convertible, wherein engaging portions for the hood sealing portion are formed at said retainer in addition to a fitting portion for said attaching base, and said hood sealing portion is a member integral with the weather strip, and wherein said hood sealing portion is assembled to the engaging portions where they are connected to the hollow sealing portion such that a part of the hood sealing portion shields between the hood portion and the engaging portions.

6. A sealing structure for a convertible having an openable and closeable top made up of a hood portion, said sealing structure comprising:

a weather strip in which at least a hollow sealing portion and an attaching base are formed integral with each other, wherein said weather strip is fitted into a retainer fixed at a hood rib, wherein end portions of an elevating side door glass are resiliently engaged in the hollow sealing portion of the weather strip when said hood portion of the convertible is closed, and a hood sealing portion is resiliently engaged in the hood portion from inside a compartment of the convertible, wherein engaging portions for the hood sealing portion are formed at said retainer in addition to a fitting portion for said attaching base, and said hood sealing portion is a member separated from the weather strip and assembled to the engaging portions between the engaging portions and the hood portion, and wherein said hood sealing portion is resiliently engaged in the hollow sealing portion so that a seal lip portion secured at the hood sealing portion shields between the hood portion and the engaging portions.

* * * * *